United States Patent
Dong et al.

(10) Patent No.: US 12,298,750 B2
(45) Date of Patent: May 13, 2025

(54) DEEP-LEARNING-BASED SLM ONLINE QUALITY MONITORING AND REPAIRING METHODS AND DEEP-LEARNING-BASED SLM ONLINE QUALITY MONITORING AND REPAIRING SYSTEM

(71) Applicant: Hunan Luojia Intelligent technology Co., Ltd., Hunan (CN)

(72) Inventors: Fang Dong, Hunan (CN); Xiangyu Lu, Hunan (CN); Guoqing Zhang, Hunan (CN); Zihan Yang, Hunan (CN); Sheng Gao, Hunan (CN); Sheng Liu, Hunan (CN)

(73) Assignee: Hunan Luojia Intelligent technology Co., Ltd., Hunan (CN)

( * ) Notice: Subject to any disclaimer, the term of this patent is extended or adjusted under 35 U.S.C. 154(b) by 0 days.

(21) Appl. No.: 18/777,455

(22) Filed: Jul. 18, 2024

(65) Prior Publication Data

US 2024/0370002 A1    Nov. 7, 2024

(51) Int. Cl.
| | |
|---|---|
| G05B 19/418 | (2006.01) |
| B22F 10/85 | (2021.01) |
| B29C 64/386 | (2017.01) |
| B33Y 50/02 | (2015.01) |
| G06T 7/00 | (2017.01) |

(52) U.S. Cl.
CPC ........ G05B 19/41875 (2013.01); B22F 10/85 (2021.01); B29C 64/386 (2017.08); B33Y 50/02 (2014.12); G06T 7/0004 (2013.01); G05B 2219/32368 (2013.01); G06T 2207/10081 (2013.01); G06T 2207/20081 (2013.01); G06T 2207/20084 (2013.01); G06T 2207/30144 (2013.01)

(58) Field of Classification Search
CPC ................................................. G05B 19/41875
See application file for complete search history.

(56) References Cited

U.S. PATENT DOCUMENTS

| | | | |
|---|---|---|---|
| 11,865,613 B2 | 1/2024 | O'Dowd | |
| 12,017,301 B2 | 6/2024 | Iyer | |
| (Continued) | | | |

FOREIGN PATENT DOCUMENTS

| | | | |
|---|---|---|---|
| CN | 116237545 A | 6/2023 | |
| CN | 116883338 A | 10/2023 | |
| (Continued) | | | |

*Primary Examiner* — Hyun D Park

(57) ABSTRACT

A deep-learning-based SLM (Selective Laser Melting) online quality monitoring method includes: designing and printing a first defective part; collecting monitoring data of a molten pool of the first defective part in the printing process and performing pre-processing; acquiring defect information distribution of the first defective part and constructing a first data set; training a first convolution neural network model through the first data set; and carrying out online defect information identification on a to-be-tested part by using the trained first convolution neural network model. On the basis of the deep-learning-based SLM online quality monitoring method, the present invention also puts forward a deep-learning-based SLM online repairing method that is used for predicting a repair parameter after identifying a print defect and performing online defect repairing.

7 Claims, 4 Drawing Sheets

(56) References Cited

U.S. PATENT DOCUMENTS

| | | | | |
|---|---|---|---|---|
| 2020/0166909 A1* | 5/2020 | Noone | ............... | G06N 20/00 |
| 2022/0134435 A1* | 5/2022 | Scime | .................. | G06T 7/11 |
| | | | | 264/112 |
| 2023/0125477 A1* | 4/2023 | Gurumurthy | ............ | G06N 3/08 |
| | | | | 382/103 |
| 2023/0302539 A1* | 9/2023 | McCarthy | ............ | B23K 26/082 |

FOREIGN PATENT DOCUMENTS

| | | |
|---|---|---|
| CN | 116921704 A | 10/2023 |
| CN | 117274150 A | 12/2023 |
| CN | 118002802 B | 5/2024 |
| CN | 117593255 B | 7/2024 |

\* cited by examiner

DEEP-LEARNING-BASED SLM ONLINE QUALITY MONITORING AND REPAIRING METHODS AND DEEP-LEARNING-BASED SLM ONLINE QUALITY MONITORING AND REPAIRING SYSTEM

TECHNICAL FIELD

The present invention belongs to the field of additive manufacturing technology, and particularly relates to deep-learning-based SLM (Selective Laser Melting) online quality monitoring and repairing methods and deep-learning-based SLM (Selective Laser Melting) online quality monitoring and repairing system.

BACKGROUND

SLM (Selective Laser Melting) is one of additive manufacturing methods. Currently, quality monitoring and prediction methods in additive manufacturing process are mostly based on the additive manufacturing method of LENS (Laser Engineered Net Shaping). However, SLM (Selective Laser Melting), as a printing method which is more capable of taking advantage of additive manufacturing, has much more monitoring and prediction accuracy and data volume than LENS (Laser Engineered Net Shaping), and it is difficult to obtain defect information accurately through a specific monitoring method because the molten pool of SLM (Selective Laser Melting) is much smaller (about 200 μm).

Existing quality monitoring methods have only proposed the idea of detecting and repairing printing defects through online monitoring equipment, but have not suggested what printing parameter should be used to repair the defects. In addition, considering the depth and width of molten pool during melting and solidification, the printing quality of current position in additive manufacturing process is not only affected by the current molten pool, but also affected by other surrounding molten pool, and at the same position, the molten pool in subsequent layer also affects the current printing quality; in the same case, the molten pool of the current print position also has an effect on the print quality of the position of the layer not printed around, as well as the print quality of the same position in the already printed layer. The existing quality monitoring methods in additive manufacturing technology do not take this into account, resulting in low accuracy of online quality monitoring.

SUMMARY

In view of the above, the present invention proposes deep-learning-based SLM (Selective Laser Melting) online quality monitoring and repairing methods and deep-learning-based SLM (Selective Laser Melting) online quality monitoring and repairing system, thereby solving the problem of low accuracy of quality monitoring and repairing in the existing additive manufacturing technology.

In a first aspect of the present invention, there is disclosed a deep-learning-based SLM online quality monitoring, wherein the method comprises:

designing and printing a first defective part;
collecting molten pool monitoring data of the first defective part in the printing process, and pre-processing the molten pool monitoring data;
performing scanning imaging and three-dimensional reconstruction on the first defective part to obtain defect information distribution;
constructing a first data set according to the pre-processed molten pool monitoring data and defect information distribution of the first defective part;
training a first convolution neural network model through the first data set for identifying whether a defect exists; and
acquiring molten pool monitoring data in real time during the printing process of a part to be tested, and performing online defect detection on the part to be tested through the trained convolutional neural network model.

On the basis of the above technical solution, preferably, the molten pool monitoring data comprise a temperature cloud map, a molten pool profile size, molten pool splash information, a molten pool reflected light intensity signal and an actual power deviation value of a laser at each printing position;

On the basis of the above technical solution, preferably, the step of designing and printing the first defective part specifically comprises:

determining the overall shape of the part, and when printing is started, using a standard printing parameter $W_0$ to print an $N_0$ layer as a substrate;
adjusting a printing parameter to obtain a defect printing parameter; and
printing the remaining part by alternately printing several layers of defect printing parameter and several layers of standard printing parameter $W_0$, so as to obtain a first defective part;
when there is a plurality of first defective parts, the above processes of printing a substrate, adjusting a printing parameter, and alternately carrying out printing are repeated to obtain the plurality of first defective parts.

On the basis of the above technical solution, preferably, the step of pre-processing the molten pool monitoring data specifically comprises:

packing and sorting the collected monitoring data of the molten pool into feature vectors $Z_{i,j,k}$ according to the molten pool position, wherein the i and j respectively represent the horizontal and vertical coordinates of the position $X_{i,j,k}$ of the molten pool in the current layer, and the k represents the current number of printed layers;
the feature vector $Z_{i,j,k}$ of the molten pool at the current position $X_{i,j,k}$ is defined as:

$$Z_{i,j,k}=(X_{i,j,k,1},X_{i,j,k,2},X_{i,j,k,3},X_{i,j,k,4},X_{i,j,k,5})$$

wherein the $X_{i,j,k,1}$ represents a temperature cloud map at the current position, the $X_{i,j,k,2}$ represents a molten pool profile size at the current position, the $X_{i,j,k,3}$ represents molten pool splash information at the current position, the $X_{i,j,k,4}$ represents a reflected light intensity signal of the molten pool, and the $X_{i,j,k,5}$ represents an actual power deviation value of a laser.

On the basis of the above technical solution, preferably, the step of constructing a first data set according to the pre-processed molten pool monitoring data and defect information distribution of the first defective part specifically comprises:

extracting feature vectors of a plurality of sampling points at each molten pool position $X_{i,j,k}$ and around position $X_{i,j,k}$ of the first defective part to construct sample attribute data;
determining whether there is a defect at the position $X_{i,j,k}$ of each molten pool according to the defect information distribution, and using a defect existence determination result as a sample label;

and constructing training samples and test samples according to the sample attribute data and the sample label at the position of each molten pool and thus establishing a first data set;

On the basis of the above technical solution, preferably, the plurality of sampling points around the position $X_{i,j,k}$ comprise: in a three-dimensional space where the position $X_{i,j,k}$ is located, on a horizontal cross section passing through the position $X_{i,j,k}$, a plurality of molten pools around the position $X_{i,j,k}$, and a plurality of molten pools with the same horizontal and vertical coordinates as the position $X_{i,j,k}$ and the plurality of molten pools around the position $X_{i,j,k}$ but different numbers of layers.

In a second aspect of the present invention, there is disclosed, on the basis of the first aspect of the present invention, a deep-learning-based SLM (Selective Laser Melting) online repairing method comprising:

designing and printing a second defective part;

collecting molten pool monitoring data of the second defective part in the printing process, and pre-processing the molten pool monitoring data;

performing scanning imaging and three-dimensional reconstruction on the second defective part to obtain defect information distribution;

constructing sample attribute data according to the pre-processed molten pool monitoring data of the second defective part;

according to the defect information distribution, comparing defect situations of a first defective part and a second defective part at the same molten pool position or under similar sample attribute data, and determining whether a corresponding defect is repaired, and if so, extracting corresponding sample attribute data and a repair parameter to establish a second data set, wherein the repair parameter comprises the number of repair layers and corresponding printing parameter;

training a second convolution neural network model through the second data set to predict a repair parameter;

if a defect occurs in the part to be tested in the printing process, using the second convolution neural network model to predict the repair parameter of the current defect;

and performing repair printing on the part to be tested according to the repair parameter for the current defect; after the current defect is repaired, ending the printing if the printing is completed; otherwise, continuing the printing, and re-performing online defect information identification and repair.

On the basis of the above technical solution, preferably, the step of designing and printing the second defective part specifically comprises:

determining the overall shape of the part, and when printing is started, using a standard printing parameter $W_0$ to print an $N_0$ layer as a substrate;

adjusting the printing parameter to obtain the same defect printing parameter as the first defective part;

adjusting the printing parameter to obtain the standard printing parameter $W_0$;

adjusting the printing parameter to obtain a compensated printing parameter;

printing the remaining part by sequentially and alternately printing a plurality of layers of defect printing parameters, a plurality of layers of standard printing parameters $W_0$, a plurality of layers of compensation printing parameters $W_0$ and a plurality of layers of standard printing parameters $W_0$, so as to obtain a second defective part;

and under a condition of having a plurality of second defective parts, repeating the above processes of printing a substrate, adjusting a printing parameter, and alternately carrying out printing to obtain the plurality of second defective parts.

On the basis of the above technical solution, it is preferred that the defective printing parameter and the compensation printing parameter are obtained by changing the laser power, the scanning interval, the scanning speed and/or the paving powder thickness on the basis of the standard printing parameter $W_0$.

In a third aspect of the present invention, a deep-learning-based SLM (Selective Laser Melting) online quality monitoring and repairing system is disclosed, comprising:

a first part print module: being used for designing and printing a first defective part;

a first data build module: being used for collecting molten pool monitoring data of the first defective part in the printing process, and pre-processing the molten pool monitoring data; performing scanning imaging and three-dimensional reconstruction on the first defective part to obtain defect information distribution; constructing a first data set according to the pre-processed molten pool monitoring data and defect information distribution of the first defective part;

a first model training module: being used for training a first convolution neural network model through the first data set to identify whether a defect exists;

a second part print module: being used for designing and printing a second defective part;

a second data build module: being used for collecting molten pool monitoring data of the second defective part in the printing process, and pre-processing the molten pool monitoring data; performing scanning imaging and three-dimensional reconstruction on the second defective part to obtain defect information distribution; constructing the sample attribute data according to the pre-processing the molten pool monitoring data of the second defective part; according to the distribution of defect information, comparing defect situations of a first defective part and a second defective part at the same molten pool position or under similar sample attribute data, and determining whether a corresponding defect is repaired, and if so, extracting corresponding sample attribute data and repair parameter to establish a second data set;

a second model training module: being used for training a second convolution neural network model through a second data set to predict a repair parameter;

an online defect identification module: being used for acquiring the monitoring data of the molten pool in the printing process of the parts to be tested in real time, and performing online defect information identification on the parts to be tested through the trained first convolution neural network model;

and an online defect repair module: being used for predicting a repair parameter of the current defect via a trained second convolution neural network model when the online defect identification module identifies a defect, performing repair printing on the parts to be tested according to the repair parameter of the current defect, ending the printing if the printing is completed after the current defect is repaired, otherwise, continuing the printing, and re-performing the online defect identification module and online defect repair module until the printing is completed.

The present invention has the following advantageous effects by contrast to the prior art:
1) The present invention trains a first convolution neural network model by collecting molten pool monitoring data and defect information distribution of a first defective part in a printing process, and can integrate multi-dimensional information, such as a temperature cloud map, molten pool profile size, molten pool splash information, molten pool reflected light intensity signal and actual power deviation value of a laser, etc. of each printing position of the part to be tested in the printing process to perform online defect information identification on the part to be tested, and can provide more comprehensive input information for the convolution neural network model, which is beneficial to discover potential associations between various types of molten pool monitoring data and defect conditions. The accuracy of defect identification and the generalization ability of the model are guaranteed.
2) In the construction of the first data set, the feature vectors of the plurality of sampling points at each molten pool position $X_{i,j,k}$ and around $X_{i,j,k}$ of the first defective part are taken to construct sample attribute data in the present invention, and the influence of other molten pool conditions around the current printing position on the printing quality of the current position and the influence of molten pool conditions in subsequent layers at the same position on the printing quality of the current position are fully taken into account, which is more consistent with the actual printing situation in the additive manufacturing process and further improves the accuracy of defect identification.
3) According to the invention, whether a corresponding defect is repaired is determined by comparing defective situations of a first defective part and a second defective part at the same molten pool position or under similar sample attribute data, so as to determine repair parameter corresponding to various types of defects, establishes a second data set, and trains a second convolution neural network model via the second data set for repair parameter prediction; during online printing, if the defect is detected by the first neural network model, the corresponding repair parameter are predicted by the second neural network model, and the repair printing is performed by the repair parameter, and the defect is repaired in time while the defect is identified online, so as to improve the printing quality.
4) According to the present invention, a first defective part is printed by alternately printing a plurality of layers of defect printing parameter $W_1$ and a plurality of layers of standard printing parameter $W_0$, and a second defective part is printed by sequentially and alternately printing several layers of defect printing parameter $W_1$, a plurality of layers of compensation printing parameter $C_1$ and a plurality of layers of standard printing parameter $W_0$. On the one hand, sufficient training data are provided for a first neural network model and a second neural network model, so as to optimize the performance of the model; on the other hand, it is convenient to study the effect of the change of printing parameter on the repair of the current defect layer, and the defect repair situation can be determined directly by comparison, which reduces the difficulty of determining whether the defect is repaired or not, facilitates the fast acquisition of repair parameter and improves the online repair speed.

BRIEF DESCRIPTION OF DRAWINGS

To illustrate the technical solutions in the embodiments of the present invention or the prior art more clearly, the accompanying drawings required to be used in the description of the embodiments or the prior art will be briefly described below, and it is obvious that the accompanying drawings in the description below only illustrate some embodiments of the present invention, and other drawings can be obtained according to these drawings for those of ordinary skill in the art without involving any inventive efforts.

DETAILED DESCRIPTION OF THE EMBODIMENTS

Reference will now be made in detail to the embodiments of the present invention, examples of which are illustrated in the accompanying drawings. It is to be understood that the present invention is to be considered as illustrative and not restrictive. Based on the embodiments of the present invention, all other embodiments obtained by a person of ordinary skill in the art without involving any inventive efforts fall within the extent of protection of the present invention.

Figure 1:
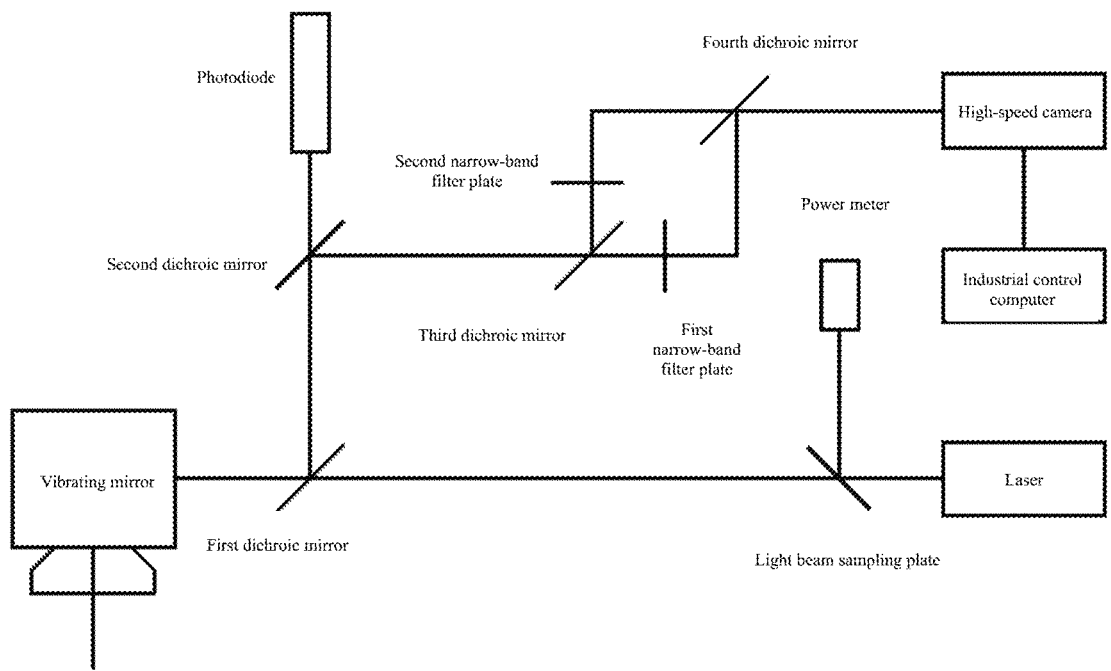
FIG. 1 is a schematic structure diagram of a multi-sensor monitoring system of the present invention.

The present invention uses a multi-sensor monitoring system to monitor an additive manufacturing forming process, and FIG. 1 shows a schematic structure diagram of the multi-sensor monitoring system, wherein the multi-sensor monitoring system comprises: a high-speed camera, a coaxial dual-band temperature measurement device, a photodiode, a power meter, a light beam sampling plate, and an industrial control computer.

The high-speed camera is used for capturing a dual-band image acquired by the coaxial dual-band temperature measurement device, carrying out calculating to obtain a molten pool temperature cloud map at each sampling, and transmitting the molten pool temperature cloud map to the industrial control computer. The high-speed camera is also used to acquire the size of the molten pool profile and the molten pool splash information of each sampling through one of the wave bands, determine whether the information about the time, position and movement direction of the molten pool splash is reasonable by using a context monitoring method to eliminate the interference of abnormal splash information, and screen and eliminate unreasonable parts.

The coaxial dual-band temperature measurement device mounted between a laser of an additive manufacturing device and a vibrating mirror comprises a first dichroic mirror, a second dichroic mirror, a third dichroic mirror, a fourth dichroic mirror, a first band narrow-band filter and a second band narrow-band filter, wherein the first dichroic mirror is arranged on the axis between the laser and the vibrating mirror, and is used for acquiring reflected light of a first waveband and a second waveband;

the second dichroic mirror arranged between the first dichroic mirror and the photodiode, wherein the second dichroic mirror and the photodiode are coaxially arranged;

the third dichroic mirror and the fourth dichroic mirror are both arranged between the second dichroic mirror and the high-speed camera, wherein the third dichroic mirror receives reflected light of the second dichroic mirror and performs light splitting processing, and the first band narrow-band filter and the second band narrow-band filter are respectively arranged on two light paths obtained by the light splitting processing of the third dichroic mirror;

and the fourth dichroic mirror is used for gathering the filtered dual-band images of the first band narrow-band filter and the second band narrow-band filter into the high-speed camera.

The photodiode is used for acquiring the reflected light intensity signal of the molten pool in the printing process, and transmitting same to the industrial control computer; the photodiode is arranged behind the second dichroic mirror, and samples the reflected light via a sampling mirror; and the remaining reflected light is incident on the coaxial dual-band temperature measurement device.

The light beam sampling plate is used for sampling the laser light beam of the laser in a small proportion, monitoring the stability of the output power of the laser through a power meter, and transmitting a signal to the industrial control computer, and enabling the industrial control computer to calculate an actual power deviation value of the laser.

And the industrial control computer is used for summarizing the monitoring results of each sensor and performing deep learning to perform space-time registration, determining the space-time consistency of the sampling information about the multi-sensor, and packing and sorting the multi-sensor data after the determination, thereby obtaining the integrated multi-sensor data and improving the accuracy of training a deep learning model subsequently.

Figure 2:
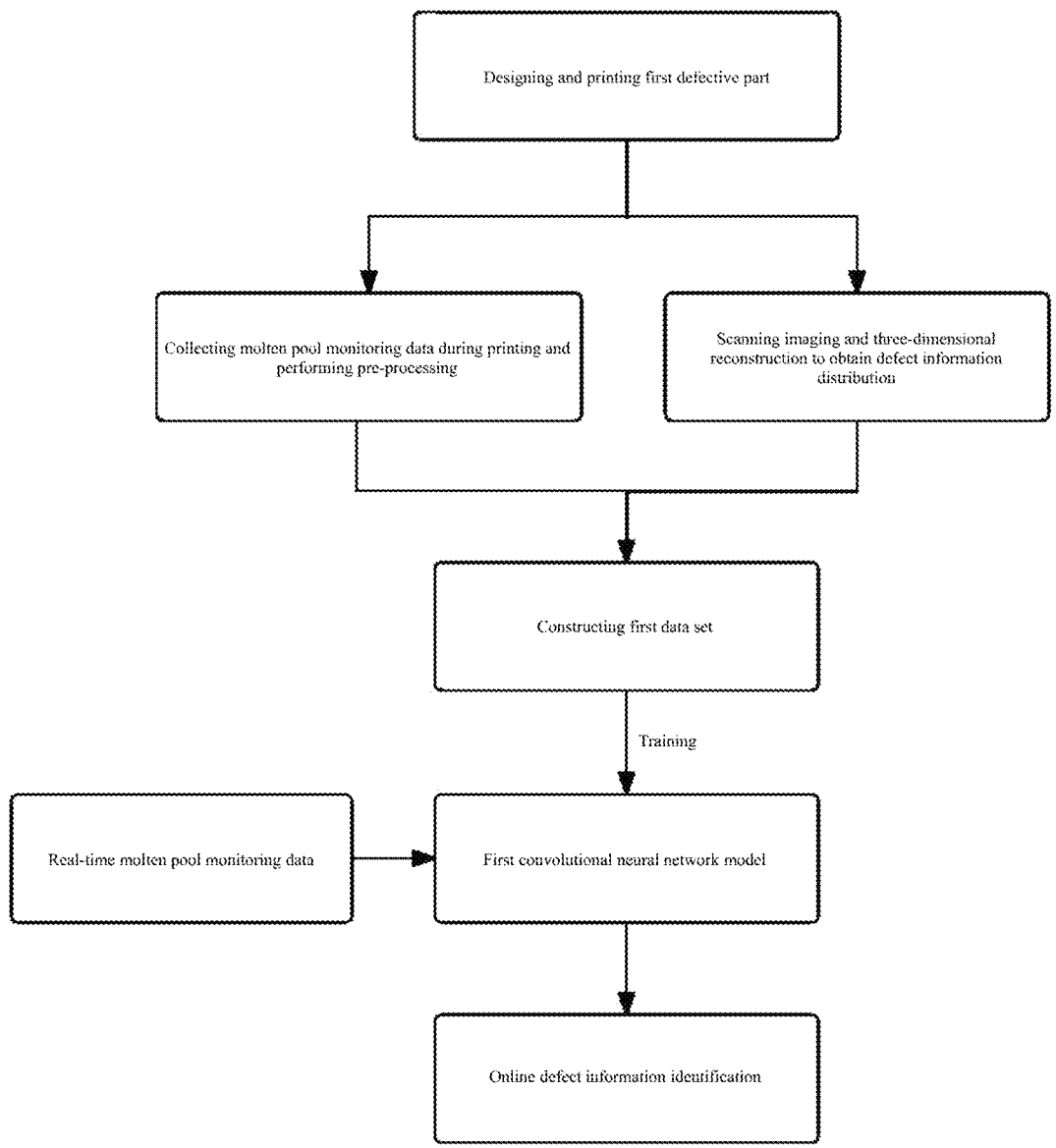
FIG. 2 is a flow chart of a deep-learning-based SLM (Selective Laser Melting) online quality monitoring method of the present invention.

Based on the above multi-sensor monitoring system, the present invention proposes a deep-learning-based SLM (Selective Laser Melting) online quality monitoring method, and FIG. 2 is a flow chart of a deep-learning-based SLM (Selective Laser Melting) online quality monitoring method of the present invention, the method comprising:

S1, designing and printing a plurality of first defective parts, wherein a plurality of first defective parts are designed and different printing parameters for printing are selected, the printing parameters generally including a scanning speed, laser power, a scanning pitch, etc. and being specifically selected according to the powder material, the shape and size of the printed part; specifically, firstly, determining the overall shape of the first defective part, and when printing is started, printing an $N_0$ layer by using a standard printing parameter $W_0$;

adjusting a printing parameter to obtain a defect printing parameter $W_1$ that is obtained by changing the laser power, scanning interval, scanning speed and powder paving thickness on the basis of the standard printing parameter;

printing the remaining part by alternately printing a plurality of layers of defect printing parameter $W_1$ and a plurality of layers of standard printing parameter $W_0$ to obtain a first defective part;

and repeating the above process of adjusting the printing parameter and alternately printing to obtain a plurality of first defective parts.

As a specific embodiment, the standard printing parameter $W_0$ is firstly used to print layers of $N_0=20$ layers as a substrate. In this part, no information collection is performed during the printing process. In order to facilitate the subsequent determination of the position of the layer where the part information collection begins, this part can be designed to be larger than the diameter of other parts by 1 mm as a distinction.

Adjusting the printing parameter to obtain a defect printing parameter $W_1$, using the defect printing parameter $W_1$ to print one layer, restoring a standard printing parameter $W_0$, and using the standard printing parameter $W_0$ to print 20 layers, wherein an area formed by combining the 21 layers is referred to as a combined area 1;

adjusting a printing parameter to be a defect printing parameter $W_1$, printing 2 layers by using the defect printing parameter $W_1$, restoring a standard printing parameter $W_0$, and printing 20 layers by using the standard printing parameter $W_0$, wherein an area formed by combining the 22 layers is referred to as a combined area 2;

adjusting a printing parameter to a defect printing parameter $W_1$, printing three layers using the defect printing parameter $W_1$, restoring a standard printing parameter $W_0$, and printing twenty layers using the standard printing parameter $W_0$, wherein an area formed by combining twenty-three layers is referred to as a combined area 3;

. . .

adjusting a printing parameter to a defect printing parameter $W_1$, printing 19 layers by using the defect printing parameter $W_1$, restoring a standard printing parameter $W_0$, and printing 20 layers by using the standard printing parameter $W_0$, wherein an area formed by combining the 39 layers is referred to as a combined area 19; and adjusting a printing parameter to a defect printing parameter $W_1$, printing 20 layers by using the defect printing parameter $W_1$, restoring a standard printing parameter $W_0$, and printing 20 layers by using the standard printing parameter $W_0$, wherein an area formed by combining the 40 layers is referred to as a combined area 20.

Finally, a printed piece with the total number of printed layers being 630 is the first defective part obtained by printing. The defect printing parameter and the standard printing parameter in the first defective part are alternately printed in order to avoid the mutual influence of two defect printing areas, and therefore 20 layers of standard printing parameters are used for separation, and the specific data of the 20 layers can be changed according to different printing materials and working environments.

As a specific embodiment, the defect printing parameter may be specifically obtained by changing the laser power to be 80% of the $W_0$ standard laser power on the basis of the standard printing parameter $W_0$; or, on the basis of the standard printing parameter $W_0$, the defect printing parameter may be specifically obtained by changing the scanning interval to be 120% of the $W_0$ standard scanning interval; or, on the basis of the standard printing parameter $W_0$, the defect printing parameter may be specifically obtained by changing the scanning speed to be 120% of the standard scanning speed of $W_0$; alternatively, on the basis of the standard printing parameter $W_0$, the defect printing parameter may be specifically obtained by changing the powder paving thickness to be 120% of the $W_0$ standard powder paving thickness.

The first defective part may be cylindrical, square, etc. and may have different design shapes according to different printing requirements. If only the influence of a single printing parameter (such as scanning speed) on the formation of defects is studied, only one first defective part can be printed; if the influence of different printing parameter on defects is studied and sufficient training data is obtained, a total of n first defective parts can be printed in the above manner. During each printing, the $N_0$ layer is also first printed by using the standard printing parameter $W_0$, the printing parameter is adjusted to obtain the defect printing parameter $W_i$, and the remaining part is printed by alternately printing a plurality of layers of the defect printing parameter $W_i$ and a plurality of layers of the standard printing parameter $W_0$ to obtain an ith first defective part, i=1, 2, 3, ... , n.

It is also possible to design different types and numbers of print combined areas according to different defect-printing parameters, so as to obtain deep learning original data meeting the requirements. This design method can not only explore the influence of the change of defect printing parameters on the quality of printed parts in each plane, but also explore the repair effect of standard printing parameters on the current defect layer by combining alternate printing of defect printing parameters and normal printing parameters.

S2, collecting the molten pool monitoring data during the printing process of each first defective part, and pre-processing the molten pool monitoring data.

The present invention uses the multi-sensor monitoring system shown in FIG. 1 to collect the molten pool monitoring data during printing of a first defective part, the molten pool monitoring data comprising a temperature cloud map, a molten pool profile size, molten pool splash information, a molten pool reflected light intensity signal and an actual power deviation value of a laser for each print position.

Wherein, the sampling frequency of multi-sensor monitoring system shall be the same as the ratio of scanning speed and the dimension of molten pool along the movement direction, expressed by formula:

$$f = v/\lambda$$

Wherein: f represents the frequency of multi-sensor system, in Hz; v is the laser scanning speed of additive manufacturing equipment, in m/s; $\lambda$ is the dimension of the molten pool in the direction of movement in m.

The multi-sensor monitoring data are collected on the industrial control computer and space-time registration is carried out, the space-time consistency of the sampling information about the multi-sensor is determined, and then the multi-sensor detection data are packed and sorted, thereby obtaining the integrated multi-sensor monitoring data for subsequent training of a deep model.

The molten pool monitoring data collected during the printing of each layer are packed and sorted into feature vectors $Z_{i,j,k}$ according to the position of the molten pool, wherein i and j respectively represent the horizontal and vertical coordinates of the position $X_{i,j,k}$ of the molten pool in the current layer, and k represents the current number of printed layers. The feature vector $Z_{i,j,k}$ of the molten pool at the current position $X_{i,j,k}$ is defined as:

$$Z_{i,j,k}=(X_{i,j,k,1},X_{i,j,k,2},X_{i,j,k,3},X_{i,j,k,4},X_{i,j,k,5})$$

Wherein, $X_{i,j,k,1}$ represents the temperature cloud map at the current position; $X_{i,j,k,2}$ represents the molten pool profile size at the current position; $X_{i,j,k,3}$ represents the molten pool splash information at the current position; $X_{i,j,k,4}$ represents the reflected light intensity signal of the molten pool; $X_{i,j,k,5}$ represents the actual power deviation value of the laser.

In order to explore the relationship between the information of molten pool temperature, splashing and keyhole defects, the present invention integrates the multi-dimensional information of each printing position, such as the temperature cloud map, molten pool profile size, molten pool splash information, molten pool reflected light intensity signal and actual power deviation value of laser, etc. in the process of part printing to perform online defect information identification on the parts to be tested, which can provide more comprehensive input information for the convolution neural network model, help to discover the potential correlation between various molten pool monitoring data and defects, and ensure the accuracy of defect identification and the generalization ability of the model.

S3, performing scanning imaging and three-dimensional reconstruction on each first defective part to obtain a defect information distribution.

Each printed first defective part is removed and the surface thereof is treated and the adhered powder is removed to determine the accuracy of marking and positioning. The part is scanned and imaged by Nano CT to obtain defect information distribution, and then the defect information is collated by three-dimensional reconstruction to obtain corresponding defect information Y at each position of the molten pool. And the defect information Y is classified as non-defective information $Y_1$ and defective information $Y_0$.

S4, constructing a first data set based on the pre-processed molten pool monitoring data and defect information distribution of each first defective part.

The collected data are divided into a training set and a test set according to a ratio of 7:3, and the specific division method is as follows: taking a plane parallel to the axis of a printed cylinder, dividing the cylinder according to a volume ratio of 7:3, using a part of corresponding data to form the training set, and another part of corresponding data as the test set.

In order to explore the influence of current molten pool position and other molten pool conditions around on printing quality, the present invention selects sampling points in the three-dimensional space where the position $X_{i,j,k}$ is located, and constructs sample attribute data. Specifically, sample attribute data are constructed by taking feature vectors of a plurality of sampling points at and around each molten pool position $X_{i,j,k}$ of the first defective part. The plurality of sampling points around the position $X_{i,j,k}$ selected by the present invention include: on a horizontal cross-section through the position $X_{i,j,k}$, a plurality of molten pool around the position $X_{i,j,k}$, and a plurality of molten pool with the same horizontal and vertical coordinates as the position $X_{i,j,k}$ and the plurality of molten pool around the position $X_{i,j,k}$ but with a different number of layers.

Whether there is a defect at the position $X_{i,j,k}$ of each molten pool is determined according to the defect information distribution, and whether there is a defect is used as a sample label;

a first data set is established by constructing a training sample and a test sample according to the sample attribute data and the sample label.

S5, training a first convolution neural network model through the first data set for identifying whether a defect exists.

As an example, one sample point at each position $X_{i,j,k}$, eight sampling points around the $X_{i,j,k}$ position on the horizontal cross-section passing through the $X_{i,j,k}$ position, and sampling points at the same position 6 layers above and 3 layers below the current layer number are taken, and sample attribute data are constructed according to the feature vectors corresponding to the sample points ($Z_{i-1,j-1,k}$, $Z_{i-1,j,k}$, $Z_{i-1,j+1,k}$, $Z_{i,j-1,k}$, $Z_{i,j,k}$, $Z_{i,j+1,k}$, $Z_{i+1,j-1,k}$, $Z_{i+1,j,k}$, $Z_{i+1,j+1,k}$, $Z_{i-1,j-1,k-3}$, $Z_{i-1,j,k-3}$, $Z_{i-1,j+1,k-3}$, $Z_{i,j-1,k-3}$, $Z_{i,j,k-3}$, $Z_{i,j+1,k-3}$, $Z_{i+1,j-1,k-3}$, $Z_{i+1,j,k-3}$, $Z_{i+1,j+1,k-3}$, $Z_{i-1,j-1,k-2}$, $Z_{i-1,j,k-2}$, $Z_{i-1,j+1,k-2}$, $Z_{i,j-1,k-2}$, $Z_{i,j,k-2}$, $Z_{i,j+1,k-2}$, $Z_{i+1,j-1,k-2}$, $Z_{i+1,j,k-2}$, $Z_{i+1,j+1,k-2}$, ..., $Z_{i-1,j-1,k+5}$, $Z_{i-1,j,k+5}$, $Z_{i-1,j+1,k+5}$, $Z_{i,j-1,k+5}$, $Z_{i,j,k+5}$, $Z_{i,j+1,k+5}$, $Z_{i+1,j-1,k+5}$, $Z_{i+1,j,k+5}$, $Z_{i+1,j+1,k+5}$, $Z_{i-1,j-1,k+6}$, $Z_{i-1,j,k+6}$, $Z_{i-1,j+1,k+6}$, $Z_{i,j-1,k+6}$, $Z_{i,j,k+6}$, $Z_{i,j+1,k+6}$, $Z_{i+1,j-1,k+6}$, $Z_{i+1,j,k+6}$, $Z_{i+1,j+1,k+6}$), wherein the sample attribute data are a feature vector matrix with a size of 5*90.

The sample attribute data are used as input and the sample label is used as an output, a convolution neural network model is trained to obtain a corresponding relationship between an input independent variable and a defect existence determining label, which is formulated as follows:

$$Y_{i,j,k}=F(Z_{i-1,j-1,k}, Z_{i-1,j,k}, Z_{i-1,j+1,k}, Z_{i,j-1,k}, Z_{i,j,k}, Z_{i,j+1,k},$$
$$Z_{i+1,j-1,k}, Z_{i+1,j,k}, Z_{i+1,j+1,k}, Z_{i-1,j-1,k-3}, Z_{i-1,j,k-3},$$
$$Z_{i-1,j+1,k-3}, Z_{i,j-1,k-3}, Z_{i,j,k-3}, Z_{i,j+1,k-3}, Z_{i+1,j-1,k-3},$$
$$Z_{i+1,j,k-3}, Z_{i+1,j+1,k-3}, Z_{i-1,j-1,k-2}, Z_{i-1,j,k-2},$$
$$Z_{i-1,j+1,k-2}, Z_{i,j-1,k-2}, Z_{i,j,k-2}, Z_{i,j+1,k-2}, Z_{i+1,j-1,k-2},$$
$$Z_{i+1,j,k-2}, Z_{i+1,j+1,k-2}, \ldots, Z_{i-1,j-1,k+5}, Z_{i-1,j,k+5},$$
$$Z_{i-1,j+1,k+5}, Z_{i,j-1,k+5}, Z_{i,j,k+5}, Z_{i,j+1,k+5}, Z_{i+1,j-1,k+5},$$
$$Z_{i+1,j,k+5}, Z_{i+1,j+1,k+5}, Z_{i,j-1,k+6}, Z_{i-1,j,k+6},$$
$$Z_{i-1,j+1,k+6}, Z_{i,j-1,k+6}, Z_{i,j,k+6}, Z_{i,j+1,k+6}, Z_{i+1,j-1,k+6},$$
$$Z_{i+1,j,k+6}, Z_{i+1,j+1,k+6})$$

Wherein F represents a mapping function of the first convolution neural network model, and $Y_{i,j,k}$ is a corresponding label;

$$Y_{i,j,k} = \begin{cases} 0, \text{When there is no defect} \\ 1, \text{When there is a defect} \end{cases}$$

the number of samples in the first data set is set as N, samples are input into a first convolution neural network (CNN) through N feature vector matrices with the size of 5*90 to capture time-space features in the matrices.

Specific training procedures include:

Data set preparation: acquiring a training set and a testing set of the first data set separately.

Data preprocessing: preprocessing the data in the data set, e.g. normalized processing, to ensure that the input data have similar dimensions during training.

CNN (convolution neural network) model construction: using a first convolution neural network model comprising a convolution layer, a pooling layer and fully connected layers to capture time-space features in a matrix, wherein the convolution layer uses two-dimensional convolution to efficiently process the spatio-temporal relationship of the matrix, there are four fully connected layers, the first fully connected layer has 256 neurons, the second fully connected layer has 128 neurons, the third fully connected layer has 64 neurons, and the fourth fully connected layer has 1 neuron, each fully connected layer uses a ReLU activation function, an output layer uses a sigmoid activation function, and an output value represents the probability of a sample being abnormal, a dropout layer is added behind each hidden layer with the ReLU activation function, with a drop rate of 0.5.

Loss function setting: the present invention uses a binary cross entropy as a loss function L, the formula is:

$$L(y, \hat{y}) = -\frac{1}{N}\sum_{i=1}^{N}[y_i \log(\hat{y}_i) + (1 - y_i)\log(1 - \hat{y}_i)]$$

Wherein N is the number of samples, $y_i$ is the true label (0 or 1) of sample i, and $\hat{y}_i$ is the prediction probability of the convolution neural network model for the sample i.

The loss function penalizes the model for inaccurate prediction of the actual label, and drives the model to adjust the weight in the correct direction to minimize the loss. The lost gradient information is used by an optimizer to update model parameters to improve model performance. This process is performed on the training data and iterates repeatedly until the model achieves better performance.

Model training: in the process of training the first convolution neural network model through the training set, each epoch represents that the model traverses all the training data once, and each batch size represents the number of samples used by the model each time. In each batch size, the model calculates the gradient from the loss function and then updates the parameters from the optimizer. In an embodiment of the present invention, epochs=30 and batch size=32 are set.

Model evaluation: in the embodiments of the present invention, the classification performance of a model on a test set is evaluated by using accuracy as an indicator. If the accuracy of the model is high, it indicates that the model can effectively detect whether the data is defective.

Since in additive manufacturing, whether there is a defect at a specific position is not only affected by the state of the molten pool at the current position, but also affected by the state of the molten pool at other positions in the three-dimensional space where the current position is located, and the additive manufacturing process is a layer-by-layer printing process, whether there is a defect at the kth layer cannot be determined when the kth layer is printed, and comprehensive assessment should be made according to the printing condition of the subsequent h layers. The size of the h value determines the size of the sample attribute data. Therefore, in order to explore an ideal sample attribute data size, sampling points with different layers can be selected respectively to obtain sample attribute data with different sizes, and the first neural network model is trained respectively to select the minimum sample attribute data which achieves the pre-set prediction accuracy so as to determine an optimal h value, which indicates that the printing defect of the kth layer is affected by the subsequent h layers at most.

S6, acquiring the monitoring data of the molten pool in the printing process of the part to be tested in real time, and performing online defect information identification on the part to be tested through the trained first convolution neural network model.

In the process of printing a part to be tested, molten pool monitoring data of a plurality of sampling points at a current molten pool position $X_{i,j,k}$ and around the position $X_{i,j,k}$ are acquired in real time and are pre-processed, the processed date are integrated into an input feature vector that is then input into the first convolutional neural network model, and a defect information recognition result is output.

Figure 3:
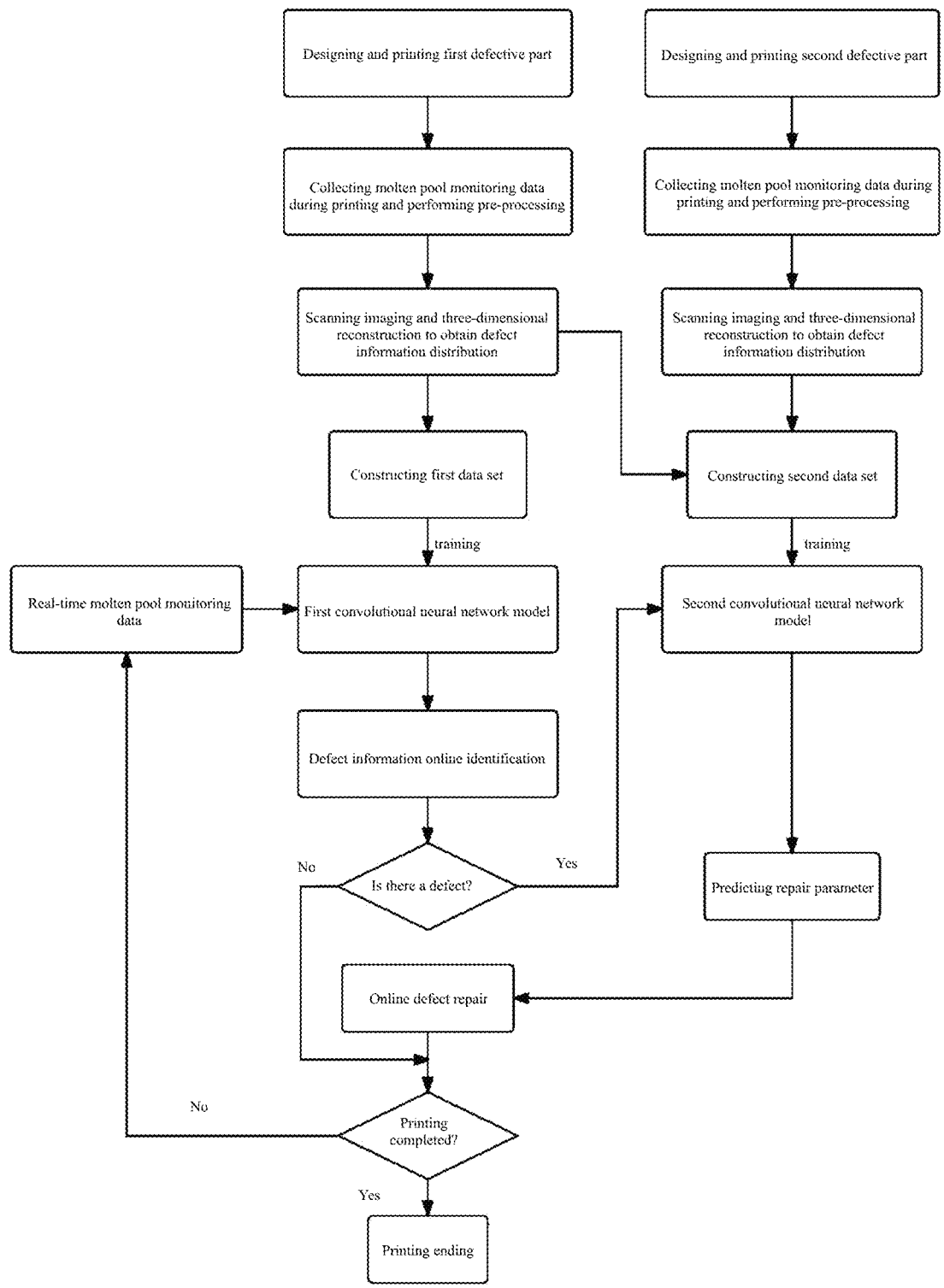
FIG. 3 is a flow chart of a deep-learning-based SLM (Selective Laser Melting) online repairing method of the present invention.

On the basis of the above-mentioned deep-learning-based SLM (Selective Laser Melting) online quality monitoring method, the present invention also proposes a deep-learning-based SLM (Selective Laser Melting) online repairing method, and FIG. 3 is a flow chart of the SLM (Selective Laser Melting) online repairing method of the present invention, which differs from the deep-learning-based SLM (Selective Laser Melting) online quality monitoring method in that the repairing method also comprises the following steps:

S7, designing and printing a plurality of second defective parts.

In correspondence to the first defective parts in the S1, the step of designing and printing a plurality of second defective parts specifically comprises:

determining the overall shape of a part, and when printing is started, using a standard printing parameter $W_0$ to print an $N_0$ layer;

adjusting a printing parameter to obtain a defect printing parameter $W_1$ which is the same as the first defective part;

adjusting a printing parameter to obtain a standard printing parameter $W_0$;

adjusting a printing parameter to obtain a compensation printing parameter $C_1$;

printing the remaining part by sequentially and alternately printing a plurality of layers of defect printing parameters $W_1$, a plurality of layers of standard printing parameters $W_0$, a plurality of layers of compensation printing parameters $C_1$ and a plurality of layers of standard printing parameter $W_0$, so as to obtain a second defective part;

if there is a plurality of second defective parts, repeating the above processes of adjusting a printing parameter and alternately performing printing to obtain a plurality of second defective parts.

As a specific embodiment, a layer of $N_0$=20 is printed as a substrate by using the standard printing parameter $W_0$;

a printing parameter is adjusted to obtain a defect printing parameter $W_1$, and one layer is printed by using the defect printing parameter $W_1$; the printing parameter is adjusted to obtain a standard printing parameter $W_0$, and h layers are printed by using the standard printing parameter $W_0$; a printing parameter is adjusted to obtain a compensation printing parameter $C_1$, and one layer is printed by using the compensation printing parameter $C_1$; the standard printing parameter $W_0$ is restored, and 20 layers are printed by using the standard printing parameter $W_0$, and an area formed by combining 22+h layers is referred to as a combined area 1;

a printing parameter is adjusted to be a defect printing parameter $W_1$, and the defect printing parameter $W_1$ is used to print two layers; a printing parameter is adjusted to be a standard printing parameter $W_0$, and h layers are printed by using the standard printing parameter $W_0$; a printing parameter is adjusted to be a compensation printing parameter $C_1$, and two layers are used by using the compensation printing parameter $C_1$; the standard printing parameter $W_0$ is restored, 20 layers are printed by using the standard printing parameter $W_0$, and an area formed by combining 24+h layers is referred to as a combined area 2;

a printing parameter is adjusted to be a defect printing parameter $W_1$, and three layers are printed by using the defect printing parameter $W_1$; a printing parameter is adjusted to be a standard printing parameter $W_0$, and h layers are printed by using the standard printing parameter $W_0$; a printing parameter is adjusted to be a compensation printing parameter $C_1$, and three layers are printed by using the compensation printing parameter $C_1$; the standard printing parameter $W_0$ is restored, 20 layers are printed by using the standard printing parameter $W_0$, and an area formed by combining 26+h layers is referred to as a combined area 3;

. . .

a printing parameter is adjusted to be a defect printing parameter $W_1$, and 19 layers are printed by using the defect printing parameter $W_1$; a printing parameter is adjusted to be a standard printing parameter $W_0$, and h layers are printed by using the standard printing parameter $W_0$; a printing parameter is adjusted to be a compensation printing parameter $C_1$, and 19 layers are printed by using the compensation printing parameter $C_1$; the standard printing parameter $W_0$ is restored, and 20 layers are printed by using the standard printing parameter $W_0$, and an area formed by combining the 58+n layers is referred to as a combined area 19;

a printing parameter is adjusted to be a defect printing parameter $W_1$, and 20 layers are printed by using the defect printing parameter $W_1$; a printing parameter is adjusted to be a standard printing parameter $W_0$, and h layers are printed by using the standard printing parameter $W_0$; a printing parameter is adjusted to be a compensation printing parameter $C_1$, and 20 layers are printed by using the compensation printing parameter $C_1$; the standard printing parameter $W_0$ is restored and 20 layers are printed by using the standard printing parameter $W_0$, and an area formed by the combination of the 60+h layers is referred to as a combined area 20.

Finally, an obtained printed piece with the total number of printed layers of 840+20h is the second defective part obtained by printing.

The defect printing parameters of the second defective parts are the same as the defect printing parameters corresponding to the first defective parts. The compensation printing parameters are obtained by changing the laser power, scanning interval, scanning speed and powder paving thickness on the basis of the standard printing parameter. After the training of the first convolution neural network is finished, it can be known that the molten pool is affected by the upper layer h at most. Therefore, in each combined area of the second defective part, the setting of printing the h layers with the standard printing parameter $W_0$ is used to reproduce the defects in the first defective part, thereby debugging experimental parameters conveniently and determining the current defect repair situation after usage of the compensation printing parameters.

As a specific embodiment, the compensation printing parameter can be specifically obtained by changing the laser power to 120% of the $W_0$ standard laser power on the basis of the standard printing parameter $W_0$, or, changing the scanning interval to 80% of the $W_0$ standard scanning interval on the basis of the standard printing parameter $W_0$, or, changing the scanning speed to 80% of the standard scanning speed of $W_0$ on the basis of the standard printing parameter $W_0$, or, changing the powder paving thickness to 80% of the $W_0$ standard powder paving thickness on the basis of the standard printing parameter $W_0$.

A total of n second defective parts can be printed in the above manner, wherein n is larger than or equal to 1. During each printing, the $N_0$ layer is also first printed by using the standard printing parameter $W_0$, and the printing parameter is adjusted to obtain the defect printing parameter and the compensation printing parameter; and the remaining part is printed by alternately printing a plurality of layers of the defect printing parameters Wi and a plurality of layers of the compensation printing parameters $C_i$, and a plurality of layers of the standard printing parameters $W_0$ to obtain an ith second defective part, wherein i satisfies a formula, i=1, 2, 3, . . . , n.

In the process of designing and printing the second defective parts, different types and numbers of printed combined areas having different printing parameter combination modes can be designed according to the requirements of different defect-printing parameters, so as to obtain original deep learning data meeting the requirements. This design method can not only explore the influence of the change of printing parameters on the defect repair of printed parts in each plane, but also explore the repair effect of defect compensation parameters and standard printing parameter on the current defect layer by combining the defect printing parameters, defect compensation parameters and standard printing parameter alternately.

S8, collecting molten pool monitoring data in the printing process of each second defective part, and pre-processing the molten pool monitoring data, wherein the molten pool monitoring data during the printing of each second defective part are collected in the same manner as in S2, and the molten pool monitoring data at each position are integrated into a feature vector.

S9, performing scanning imaging and three-dimensional reconstruction on each second defective part to obtain defect information distribution.

Nano CT is used to scan and reconstruct the second defective parts, and the defect information of each molten pool position is obtained.

S10, constructing sample attribute data based on the molten pool monitoring data after the pretreatment of each second defective part.

Sample attribute data for the second defective parts are constructed in the same manner as in S4 and S5. That is, the sample attribute data of each second defective part are constructed by using feature vectors of a plurality of sampling points at each molten pool position $X_{i,j,k}$ and around the position $X_{i,j,k}$ in the second defective part.

S11, comparing the first defective parts with the second defective parts, determining the defect repair situations, and establishing a second data set according to the defect repair situations.

Specifically, the defect situations of the first defective part and the second defective part at the same molten pool position or under similar sample attribute data are compared, whether the corresponding defect is repaired is determined, and if so, corresponding sample attribute data and repair parameters are extracted to establish a second data set, wherein the repair parameters include the number of repair layers and the corresponding printing parameter.

If a defect at a certain position in a first defective part is repaired in a corresponding second defective part, it is indicated that the compensation printing parameter of the second defective part at the position can effectively repair the defect, so that the printing parameter at the position can be used for defect repair in the case of similar defects; therefore whether each corresponding defect is repaired can be respectively determined according to the defect distribution. If the defect is repaired, the printing parameter and the number of repair layers at the corresponding location may be extracted as repair parameters, and a second data set is established based on the sample attribute data and the repair parameter at the corresponding location.

Since the sample attribute data are feature vector matrices, the similarity between the sample attributes can be calculated by calculating the cosine similarity; if the similarity between the sample attribute data of a certain position in the first defective part and the sample attribute data of a certain position in the second defective part is higher, a defect exists at the position in the first defective part, and no defect exists at the corresponding position in the second defective part, the defect is determined to have been repaired, and the printing parameter and the number of repair layers at the corresponding position in the second defective part can be extracted as the repair parameters.

S12, training a second convolution neural network model through the second data set for predicting a repair parameter.

Specifically, a second convolution neural network model is trained with sample attribute data in the second data set as an input and a corresponding repair parameter as an output, and the trained second convolution neural network model can be used for predicting the repair parameter.

In the present invention, a first defective part is printed by alternately printing a plurality of layers of defect printing parameters $W_1$ and a plurality of layers of standard printing parameters $W_0$, and a second defective part is printed by alternately printing a plurality of layers of defect printing parameters $W_1$, a plurality of layers of standard printing parameters $W_0$, a plurality of layers of compensation printing parameters $C_1$ and a plurality of layers of standard printing parameters $W_0$ in sequence, and thus defect repair conditions can be directly determined by means of comparison, thereby reducing the difficulty of defect repair determination; and a second data set is established according to the defect repair conditions, so as to provide sufficient training data for a second convolution neural network model. When a defect occurs, the sample attribute data can be constructed according to the sampling points of the defect position and its surrounding position, and the repair parameter can be accurately predicted.

S13, if a defect occurs in the printing process of a part to be tested, predicting a repair parameter of the current defect through the second convolution neural network model; repairing and printing the part to be tested according to the repair parameter of the current defect; after the current defect is repaired, ending the printing if the printing is completed; otherwise, continuing the printing, and re-performing online defect information identification and repair.

Figure 4:
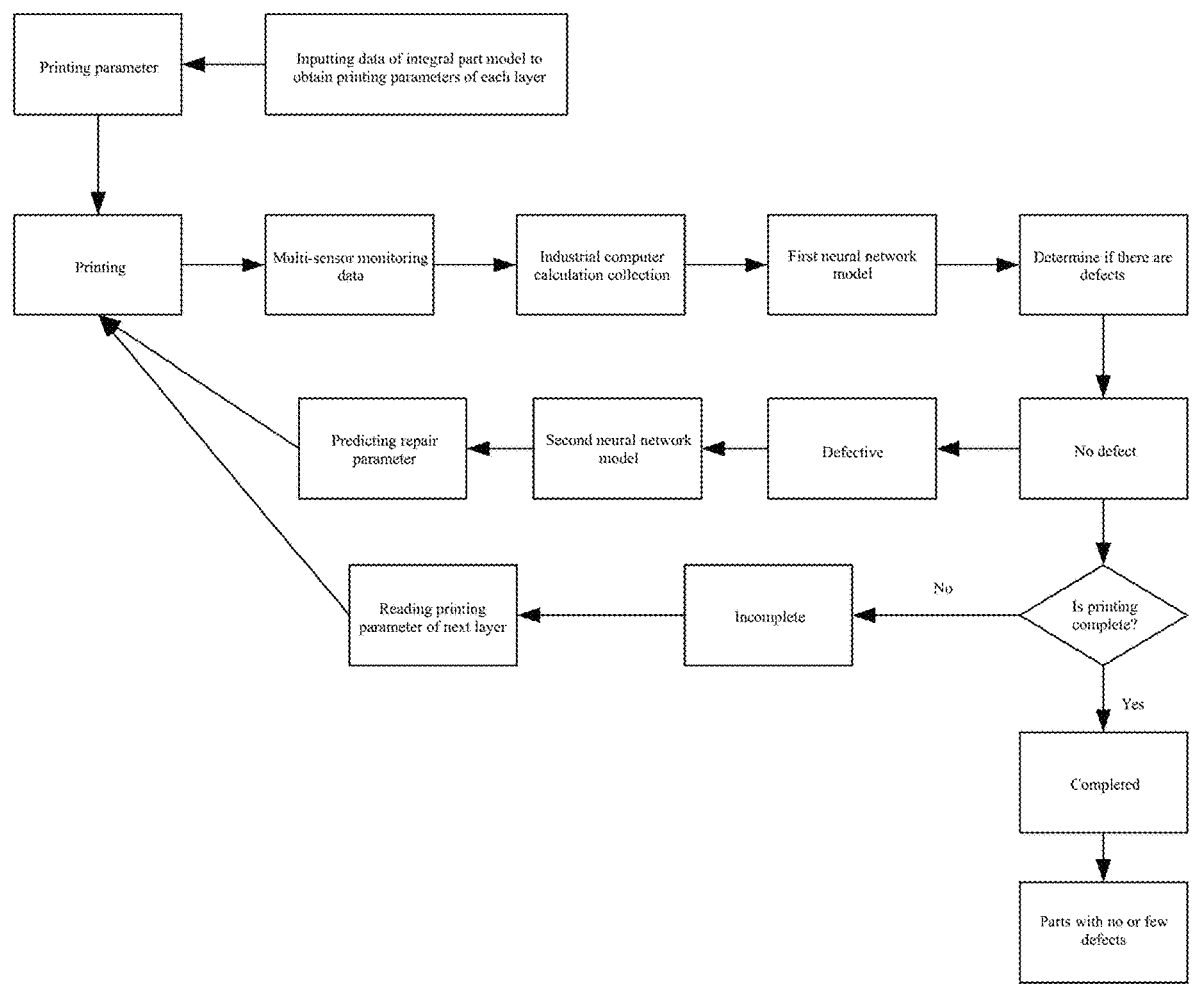
FIG. 4 is a schematic diagram of online identification and repair of defect information for a part to be tested according to the present invention.

FIG. 4 is a schematic diagram showing online identification and repair of defect information for a part to be tested. Print data of each layer of an integral part model are input into additive manufacturing equipment to acquire the print data of the first layer and then printing is carried out. In the printing process, the multi-sensor monitoring system is used to monitor the printing process, and the obtained data are input into industrial control computer for summarization and analysis. The obtained data are constructed into input data identical to the sample attribute data, and the input data are input into the obtained first neural network to perform defect assessment. If it is determined that there is a defect, then the input data are input into a second neural network model to predict a repair parameter, and repair printing is performed by using the predicted repair parameter. If the defect repair is completed, whether workpiece printing is completed at this moment is determined; if not, a printing parameter of the next layer is read, the remaining printing process of the part to be tested is implemented continuously and the process of on-line defect identification and repair is repeated; if the current workpiece has been printed, the printing process of the workpiece is ended, and a workpiece with no defect or few defects is obtained.

According to the present invention, online defect identification is carried out via the first neural network model during online printing, and if a defect is detected, a corresponding repair parameter is predicted via the second neural network model so as to perform repair printing according to the corresponding repair parameter, and defect repair is carried out in time while online defect identification is performed so as to improve printing quality.

By corresponding to the above-mentioned embodiment of a deep-learning-based SLM (Selective Laser Melting) online repairing method, the present invention also proposes a deep-learning-based SLM (Selective Laser Melting) online quality monitoring and repairing system, comprising:

a first part print module: for designing and printing a first defective part;

a first data construction module: for collecting molten pool monitoring data of the first defective part in the printing process, and pre-processing the molten pool monitoring data; performing scanning imaging and three-dimensional reconstruction on the first defective part to obtain defect information distribution; constructing a first data set according to the pre-processed molten pool monitoring data and defect information distribution of the first defective part;

a first model training module: for training a first convolution neural network model through the first data set to identify whether a defect exists;

a second part print module: for designing and printing a second defective part;

a second data construction module: for collecting molten pool monitoring data of the second defective part in the printing process, and pre-processing the molten pool monitoring data; performing scanning imaging and three-dimensional reconstruction on the second defective part to obtain defect information distribution; constructing the sample attribute data according to the monitoring data of the molten pool after the second defective part pretreatment; comparing the defect situation of the first defective part and the second defective part at the same molten pool position or under similar sample attribute data, and judging whether the corresponding defect is repaired, and if so, extracting the corresponding sample attribute data and repair parameter to establish a second data set;

a second model training module: for training a second convolution neural network model through a second data set to predict a repair parameter;

an online defect identification module: for acquiring the monitoring data of the molten pool of a part to be tested in the printing process in real time, and performing online defect information identification on the part to be tested through the trained first convolution neural network model;

an online defect repair module: when the online defect identification module identifies a defect, predicting a repair parameter of a current defect via the trained second convolution neural network model; according to the repair parameter of the current defect, performing repair printing on the part to be tested; after the current defect is repaired, ending the printing if the printing is completed; otherwise, continuing the printing, and re-enabling the online defect identification module and online defect repair module to work repeatedly until the printing is completed.

The above embodiments of the system correspond to the embodiments of the methods, and reference is made in the embodiments of the methods for brief description of the embodiments of the system.

The present invention also discloses an electronic device comprising: at least one processor, at least one memory, a communication interface, and a bus, wherein the processor, the memory and the communication interface carry out communication with each other via the bus; the memory stores program instructions executable by the processor which can invoke the program instructions to implement the methods of the present invention.

The present invention also discloses a computer-readable storage medium for storing computer instructions that enable a computer to perform all or part of the steps of the methods according to the embodiments of the invention. The storage medium comprises: various media that can store program codes, such as a USB flash disk, a removable hard disk, a read-only memory (ROM), a random access memory (RAM), a magnetic disk or an optical disk The above-mentioned system embodiments are merely schematic, wherein units illustrated as separate components may or may not be physically separated, and parts shown as units may or may not be physical units, i.e. may be distributed on a plurality of network units. A person of ordinary skilled in the art would have been able to select some or all of the modules therein to achieve the purpose of the solution of the present embodiments according to actual needs without involving any inventive effort.

While the present invention has been described with reference to the preferred embodiments thereof, which are given as nonlimiting examples; it should be understood that various modifications, equivalents, improvements, and the like can fall within the extent of protection of the present invention.

What is claimed is:

1. A deep-learning-based SLM (Selective Laser Melting) online quality monitoring method, comprising:

designing and printing a first defective part;

collecting molten pool monitoring data of the first defective part in a printing process through a multi-sensor monitoring system, and pre-processing the molten pool monitoring data;

performing scanning imaging and three-dimensional reconstruction on the first defective part to obtain defect information distribution;

constructing a first data set based on the pre-processed molten pool monitoring data and the defect information distribution of the first defective part;

the constructing the first data set based on the pre-processed molten pool monitoring data and the defect information distribution of the first defective part, to be specific, the construction step comprising:

extracting feature vectors of a plurality of sampling points at each molten pool position $X_{i,j,k}$ and around position $X_{i,j,k}$ of the first defective part to construct sample attribute data; the plurality of sampling points around the position $X_{i,j,k}$ including in a three-dimensional space where the position $X_{i,j,k}$ is located, on a horizontal cross section passing through the position $X_{i,j,k}$, a plurality of molten pools around the position $X_{i,j,k}$, and a plurality of molten pools with same horizontal and vertical coordinates as the position $X_{i,j,k}$ and several molten pools around the position $X_{i,j,k}$ but different numbers of layers, wherein i and j respectively represent horizontal and vertical coordinates of the position of the molten pool, and k represents a current number of printed layers, and the feature vector of the sampling point is a vector composed by respectively packing and sorting the collected molten pool monitoring data according to the position of the molten pool;

determining whether there is a defect at the position $X_{i,j,k}$ of each molten pool according to the defect information distribution, and use whether there is a defect as a sample label;

establishing the first data set by constructing training samples and test samples according to the sample attribute data and the sample label at the position of each molten pool;

training a first convolution neural network model through the first data set for identifying whether a defect exists;

acquiring molten pool monitoring data of a part to be tested in real time during the printing process, and performing online defective detection on the part to be tested through the trained convolutional neural network model;

wherein the step of training the first convolution neural network model through the first data set comprises:

acquiring the training samples and the test samples of the first data set separately;

normalizing the data in the first data set;

constructing the first convolutional neural network model comprising a convolution layer, a pooling layer and fully connected layers;

using a binary cross entropy as a loss function;

training the first convolutional neural network model using the sample attribute data of the training samples as input and the sample label as output, the first convolutional neural network model calculating a gradient based on the loss function, and then updating parameters via an optimizer;

evaluating a classification performance of the first convolutional neural network model on testing samples using accuracy as an indicator;

wherein the step of collecting molten pool monitoring data of the first defective part in the printing process through the multi-sensor monitoring system comprises:

capturing a dual-band image acquired by a coaxial dual-band temperature measurement device with a high-speed camera, which is then transmitted to an industrial control computer to obtain a temperature cloud map, a molten pool profile size, and molten pool spatter information at each sampling;

acquiring a molten pool reflected light intensity signal in the printing process using a photodiode, and transmitting the molten pool reflected light intensity signal to the industrial control computer;

sampling a laser light beam of a laser in a small proportion using a light beam sampling plate, and monitoring an output power stability of the laser through a power meter, and transmitting a signal to the industrial control computer.

2. The deep-learning-based SLM (Selective Laser Melting) online quality monitoring method according to claim 1, wherein the molten pool monitoring data comprises the temperature cloud map, the molten pool profile size, molten pool splash information, the molten pool reflected light intensity signal and an actual power deviation value of the laser at each printing position.

3. The deep-learning-based SLM (Selective Laser Melting) online quality monitoring method according to claim 2, wherein the step of pre-processing the molten pool monitoring data specifically comprises:

packing and sorting the collected monitoring data of the molten pool into feature vectors $Z_{i,j,k}$ according to the molten pool position, wherein i and j respectively represent the horizontal and vertical coordinates of the position $X_{i,j,k}$ of the molten pool in the current layer, and k represents the current number of printed layers;

the feature vector $Z_{i,j,k}$ of the molten pool at the current position $X_{i,j,k}$ is defined as:

$$Z_{i,j,k}=(X_{i,j,k,1},X_{i,j,k,2},X_{i,j,k,3},X_{i,j,k,4},X_{i,j,k,5})$$

wherein the $X_{i,j,k,1}$ represents the temperature cloud map at the current position, the $X_{i,j,k,2}$ represents the molten pool profile size at the current position, the $X_{i,j,k,3}$ represents the molten pool splash information at the current position, the $X_{i,j,k,4}$ represents the reflected light intensity signal of the molten pool, and the $X_{i,j,k,5}$ represents the actual power deviation value of the laser.

4. The deep-learning-based SLM (Selective Laser Melting) online quality monitoring method according to claim 1, wherein the step of designing and printing the first defective part specifically comprises:

determining the overall shape of the part, and when printing is started, using a standard printing parameter $W_0$ to print an $N_0$ layer as a substrate;

adjusting the printing parameter to obtain a defective printing parameter;

printing the remaining part by alternately printing several layers of defect printing parameter and several layers of standard printing parameter $W_0$, so as to obtain a first defective part;

and when there is a plurality of first defective parts, repeating the above processes of printing a substrate, adjusting a printing parameter, and alternately printing to obtain a plurality of first defective parts.

5. A deep-learning-based SLM (Selective Laser Melting) online repairing method, comprising:

designing and printing a first defective part;

collecting molten pool monitoring data of the first defective part in a printing process, and pre-processing the molten pool monitoring data;

performing scanning imaging and three-dimensional reconstruction on the first defective part to obtain defect information distribution;

constructing a first data set based on the pre-processed molten pool monitoring data and the defect information distribution of the first defective part;

the constructing the first data set based on the pre-processed molten pool monitoring data and the defect information distribution of the first defective part, to be specific, the construction step comprising:

extracting feature vectors of a plurality of sampling points at each molten pool position $X_{i,j,k}$ and around position $X_{i,j,k}$ of the first defective part to construct sample attribute data; the plurality of sampling points around the position $X_{i,j,k}$ including in a three-dimensional space where the position $X_{i,j,k}$ is located, on a horizontal cross section passing through the position $X_{i,j,k}$, a plurality of molten pools around the position $X_{i,j,k}$, and a plurality of molten pools with same horizontal and vertical coordinates as the position $X_{i,j,k}$ and several molten pools around the position $X_{i,j,k}$ but different numbers of layers, wherein i and i respectively represent horizontal and vertical coordinates of the position of the molten pool, and k represents a current number of printed layers, and the feature vector of the sampling point is a vector composed by respectively packing and sorting the collected molten pool monitoring data according to the position of the molten pool;

determining whether there is a defect at the position $X_{i,j,k}$ of each molten pool according to the defect information distribution, and use whether there is a defect as a sample label;

establishing the first data set by constructing training samples and test samples according to the sample attribute data and the sample label at the position of each molten pool;

training a first convolution neural network model through the first data set for identifying whether a defect exists;

acquiring molten pool monitoring data of a part to be tested in real time during the printing process, and performing online defective detection on the part to be tested through the trained convolutional neural network model;

designing and printing a second defective part;

collecting a molten pool monitoring data of the second defective part in the printing process, and pre-processing the molten pool monitoring data;

performing scanning imaging and three-dimensional reconstruction on the second defective part to obtain a defect information distribution;

constructing a sample attribute data according to a pre-processed molten pool monitoring data of the second defective part;

according to the defect information distribution, comparing defective situations of the first defective part and the second defective part at the same molten pool position or under similar sample attribute data, and determining whether the corresponding defect is repaired, and if so, extracting the sample attribute data and a repair parameter corresponding to the second defective part, and establishing a second data set; the repair parameter comprises a number of repair layer and corresponding printing parameter;

training a second convolution neural network model through the second data set for predicting repair parameter;

if a defect occurs in the part to be tested during the printing process, predicting a repair parameter of the current defect by the second convolutional neural network model; and performing repair printing on the part to be tested according to the repair parameter of the current defect; and after the current defect is repaired, ending the printing if the printing is completed, otherwise continuing the printing, and re-performing online defect information identification and repair.

6. The deep-learning-based SLM (Selective Laser Melting) online repairing method according to claim 5, wherein the step of designing and printing a second defective part specifically comprises:

determining the overall shape of the part, and when printing is started, using a standard printing parameter $W_0$ to print an $N_0$ layer as a substrate;

adjusting the printing parameter to obtain the same defective printing parameter as a first defective part;

adjusting the printing parameter to obtain the standard printing parameter $W_0$;

adjusting the printing parameter to obtain a compensated printing parameter;

printing the remaining part by sequentially and alternately printing a plurality of layers of defect printing parameter, a plurality of layers of standard printing parameter $W_0$, a plurality of layers of compensation printing parameter and a plurality of layers of standard printing parameter $W_0$ to obtain a second defective part; and under a condition of having a plurality of second defective parts, repeating the above processes of printing a substrate, adjusting a printing parameter, and alternately printing to obtain the plurality of second defective parts.

7. The deep-learning-based SLM (Selective Laser Melting) online repairing method according to claim 6, wherein the defective printing parameter and the compensation printing parameter are obtained by changing the laser power, the scanning interval, the scanning speed and/or the paving powder thickness on the basis of the standard printing parameter $W_0$.

* * * * *